(No Model.) 2 Sheets—Sheet 1.

R. W. HARE & R. SPROUL.
TWO WHEELED VEHICLE.

No. 364,921. Patented June 14, 1887.

WITNESSES:
J. B. McGinn.
Geo. C. Poulton.

INVENTORS
Robert W. Hare
and Robert Sproul
BY Connolly Bros
ATTORNEYS (No Model.) 2 Sheets—Sheet 2.

R. W. HARE & R. SPROUL.
TWO WHEELED VEHICLE.

No. 364,921. Patented June 14, 1887.

WITNESSES:
J. P. McGinn.
Geo. E. Poulton.

INVENTORS
Robert W. Hare
and Robert Sproul
BY Connolly Bros.
ATTORNEYS

UNITED STATES PATENT OFFICE.

ROBERT W. HARE AND ROBERT SPROUL, OF PITTSBURG, PENNSYLVANIA.

TWO-WHEELED VEHICLE.

SPECIFICATION forming part of Letters Patent No. 364,921, dated June 14, 1887.

Application filed January 19, 1887. Serial No. 224,797. (No model.)

*To all whom it may concern:*

Be it known that we, ROBERT W. HARE and ROBERT SPROUL, citizens of the United States, residing at Pittsburg, in the county of Allegheny and State of Pennsylvania, have invented certain new and useful Improvements in Wheeled Vehicles; and we do hereby declare the following to be a full, clear, and exact description of the invention, reference being had to the accompanying drawings, which form part of this specification.

This invention has relation to wheeled vehicles, and relates more particularly to that class of two-wheeled vehicles known as "cabs," and has for its object, first, the provision of means for permitting of ready ingress to and egress from the vehicle; second, the provision of means for relieving the horse's back of weight when the vehicle is at rest, and for sustaining the vehicle in an upright position in the stable or carriage-house; third, the provision of means whereby the shafts of the vehicle may be readily detached and replaced.

Our invention consists in the novel construction of the body of the vehicle and the arrangement of the doors therein; in the novel construction and arrangement of the shafts and the devices whereby they are detachably secured to the vehicle; in the novel construction and arrangement of the devices for supporting the weight of the forward part of the vehicle; and, finally, in the novel construction, combination, and arrangement of parts hereinafter described and specifically claimed.

Figure 1:
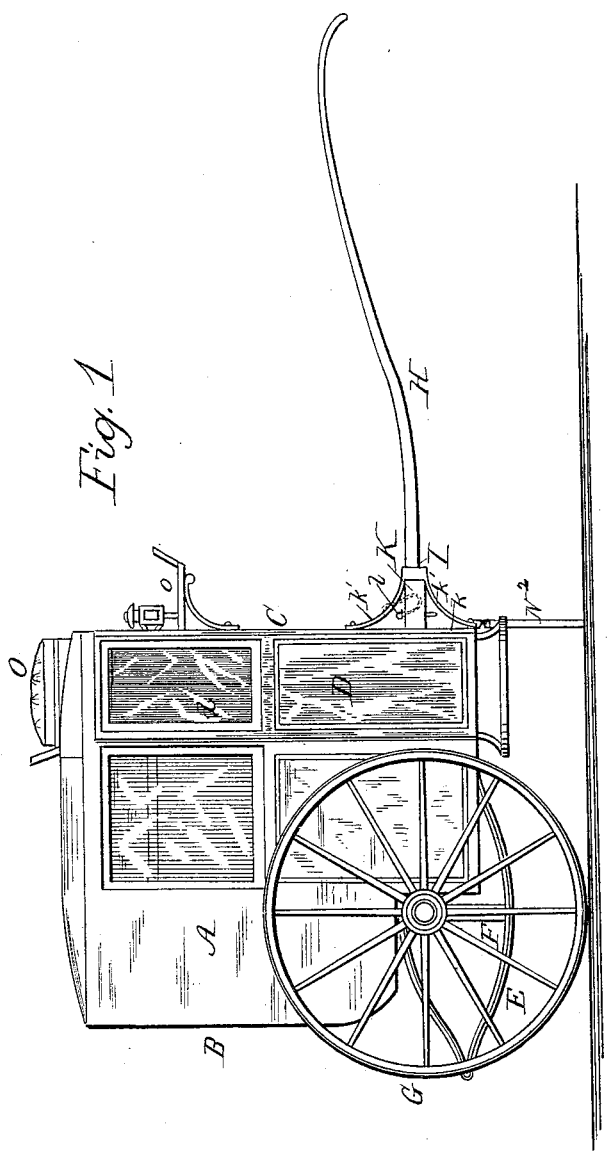
Figure 2:
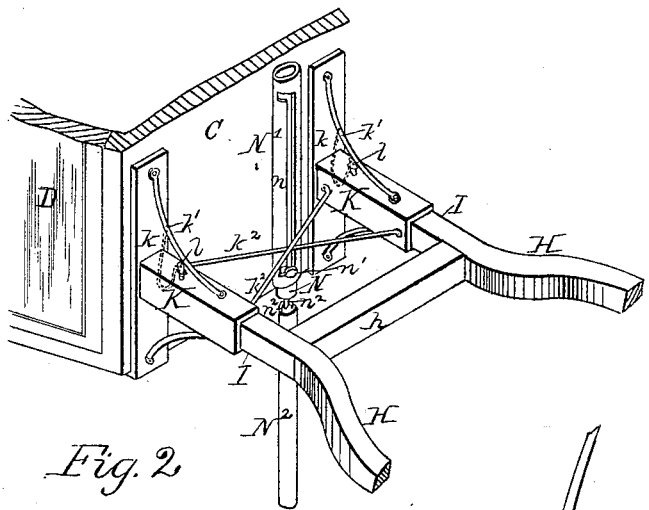
Figure 3:
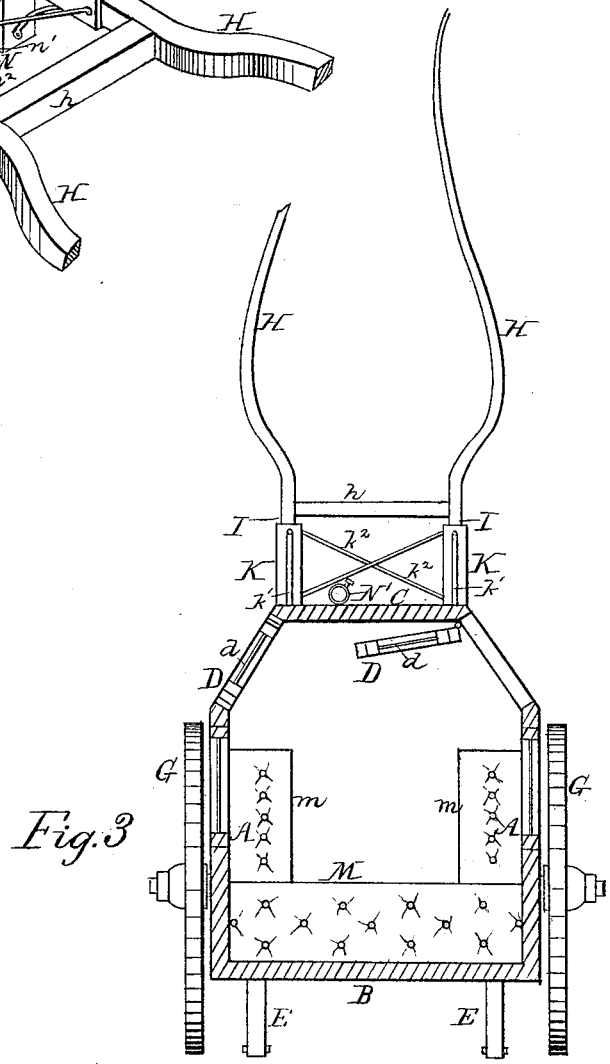

Referring to the accompanying drawings, Figure 1 is an elevation of a two-wheeled vehicle constructed according to our invention; Fig. 2, a perspective view of a portion of the vehicle and the shafts, illustrating the manner of securing the latter in position; Fig. 3, a horizontal sectional view of the vehicle shown in Fig. 1.

A $a$ designate the sides and B the back of the vehicle-body, erected in the ordinary manner upon a suitable frame.

C designates the front of the vehicle-body, which is parallel with the back B, and D D two doors set in a suitable framing, which is at an obtuse angle to the sides and front of the vehicle-body and extends from top to bottom of the same. These doors are each provided with a large light or window, $d$, and are hinged at $e$, so as to open inwardly, as shown in Fig. 3 of the drawings, where one of the doors is represented as being open.

The body, constructed as described, is supported upon the semi-elliptical springs E E, the bent axle F, and the wheels G G, the body being cut in at the back and lower edge, as shown, for the accommodation of the springs and axle.

H H designate the shafts which are united at their rear ends by a cross-piece, $h$, to which the singletree is attached. At the rear of the cross-piece, and formed either as a prolongation of the shafts or as separate pieces attached to the said cross-piece are two arms, I I, which fit into two sockets, K K, secured to the front C of the vehicle by base-plates $k$ $k$, and braced by rods $k'$ $k'$ and $k^2$ $k^2$.

N designates a straight metallic rod fitted and sliding in a case, N', which is secured to the front C, near one of the sockets K, a bayonet-slot, $n$, in the case, and a pin, $n'$, on the rod serving as a means of maintaining the rod either up within the case or projecting out of the lower end thereof, as desired. To the lower end of the rod N is hung, by staples $n^2$ $n^2$, a rod, N², which, when the rod N is projected out of its case, hangs down to the ground and forms a leg for the support of the weight of the forward part of the vehicle and the shafts when the vehicle is at rest, thereby relieving the horse to that extent, and also serves to support the vehicle in an upright position when the shafts have been removed, the flexible jointing of the rod N² to the rod N permitting of a certain amount of movement of the vehicle backward or forward by the movement of the horse while standing without danger of breaking or bending the leg.

Within the body of the vehicle, and extending from side to side thereof, is a seat, M, and in front of the seat M and hinged to the sides of the body are two supplemental seats, $m$ $m$, which, when not in use, are folded down against the sides, the vehicle being primarily intended to accommodate but two passengers, and the seat $m$ $m$ being intended for use only in case of an emergency.

O designates the driver's seat, which is placed upon top of and at the front of the vehicle, a foot-board, o, being secured upon the front C, as shown.

Suitable devices may be provided whereby the driver can open and close the doors D D without leaving his seat, and such other appurtenances as have been found useful in vehicles of this class.

The vehicle constructed as described and shown is, it is believed, a decided improvement on others of its class now in use. The position of the doors is such as renders it easy and convenient to get into or out of the vehicle from the pavement, and the doors are so high that there is no danger of the passenger striking his head in getting in or out. The doors being set at an angle to the sides of the vehicle, and being provided with windows, the occupant of the vehicle is enabled to look ahead on the route which the vehicle is pursuing. The shafts are removable, being held in the sockets K K by pins $l\ l$, and these removable shafts allow of a large number of the vehicles being stored in comparatively small space in the stable or carriage-house. When the shafts are removed, or at any time when the vehicle is at rest, the weight of the forward part of the same is sustained by the leg $N^2$, which is brought into position by projecting the rod N out of the case and fastening it in that position by turning it slightly, so as to cause the pin on the rod to engage in the notch at the lower end of the bayonet-slot. When the leg $N^2$ is not in use, it is drawn up into the case N', along with the rod N, and held up by turning the pin on the rod into the upper notch in the bayonet-slot.

Having fully described our invention, we claim—

1. In a two-wheeled vehicle, the combination, with the body of the vehicle, of the doors D D, set at an obtuse angle to the sides of the body and hinged at $e$ to the front C, so as to open within the same, substantially as shown and described.

2. In a two-wheeled vehicle, the combination, with the body and the sockets K K secured thereto, of the shafts having the projecting arms I I, adapted to fit in said sockets, and the removable pins $l\ l$, passing through the walls of the sockets and the said arms, whereby the shafts are rigidly and removably attached, substantially as described.

3. In a two-wheeled vehicle, the combination, with the body of the vehicle, of the case N', secured to the front thereof, the rod N sliding in said case and having a pin working in a bayonet-slot in said case, and the leg $N^2$, hinged to the rod N, all constructed and arranged substantially as described.

In testimony that we claim the foregoing we have hereunto set our hands this 17th day of January, 1887.

ROBERT W. HARE.
ROBERT SPROUL.

Witnesses:
JOHN F. ATCHESON,
JOS. B. CONNOLLY.